(12) United States Patent
Pawar et al.

(10) Patent No.: US 12,733,571 B2
(45) Date of Patent: Sep. 15, 2026

(54) CROP HARVESTING SYSTEM AND METHOD

(71) Applicant: Deere & Company, Moline, IL (US)

(72) Inventors: Mahesh Y. Pawar, Pune (IN); Sourin Ghosh, Pune (IN); Dipashri P. Joshi, Pune (IN); Pankaj R. Kadam, Pune (IN)

(73) Assignee: DEERE & COMPANY, Moline, IL (US)

( * ) Notice: Subject to any disclaimer, the term of this patent is extended or adjusted under 35 U.S.C. 154(b) by 201 days.

(21) Appl. No.: 18/906,277

(22) Filed: Oct. 4, 2024

(65) Prior Publication Data

US 2026/0096504 A1 Apr. 9, 2026

(51) Int. Cl.

| | |
|---|---|
| ***A01D 34/00*** | (2006.01) |
| ***A01D 61/00*** | (2006.01) |
| ***G06T 7/62*** | (2017.01) |
| *G01N 22/04* | (2006.01) |

(52) U.S. Cl.

CPC ......... *A01D 34/006* (2013.01); *A01D 61/002* (2013.01); *G06T 7/62* (2017.01); *G01N 22/04* (2013.01); *G06T 2207/10012* (2013.01); *G06T 2207/30188* (2013.01); *G06T 2207/30252* (2013.01)

(58) Field of Classification Search

CPC ........ A01D 34/006; A01D 61/002; B06T 7/62

See application file for complete search history.

(56) References Cited

U.S. PATENT DOCUMENTS

| | | | | |
|---|---|---|---|---|
| 11,369,052 | B2 | 6/2022 | Cozza et al. | |
| 11,761,757 | B2 | 9/2023 | Smith | |
| 12,575,495 | B2 * | 3/2026 | Schroeder | A01D 41/127 |
| 2008/0234017 | A1 * | 9/2008 | Bundy | A01D 41/1274 460/98 |
| 2018/0213716 | A1 * | 8/2018 | Gonzalez-Mohino | A01D 34/003 |

FOREIGN PATENT DOCUMENTS

| | | | |
|---|---|---|---|
| GB | 2362127 | A1 | 11/2001 |
| WO | WO 2021214580 | A1 | 10/2021 |

* cited by examiner

*Primary Examiner* — Luke Huynh

(57) ABSTRACT

A crop harvester system includes an image sensor is positioned to capture a stereo image of crop material disposed in a region forward of a harvester implement. A radar system is positioned to receive a returned electromagnetic signal reflected from crop material in the region. A controller determines a volume of the crop material in the region from the stereo image, and determines a moisture content and a density of the crop material in the region from the returned electromagnetic signal. Based on the volume of the crop material, the moisture content of the crop material, and the density of the crop material in the region, the controller may then control one of a traction unit and the harvester implement while the harvester implement is cutting the crop material in the region to avoid plugging an auger of the harvester implement with the cut crop material.

20 Claims, 6 Drawing Sheets

CROP HARVESTING SYSTEM AND METHOD

TECHNICAL FIELD

The disclosure generally relates to a crop harvester system, and a method of controlling the crop harvester system to prevent plugging of a harvester implement.

BACKGROUND

A crop harvester system may include a traction unit and a harvester implement coupled to the traction unit. The traction unit may be configured to move across a ground surface, and include a drive system operable to provide power to the crop harvester system. The harvester implement may be configured to cut or sever the crop material from the ground surface, and move the cut crop material through the harvester implement for further processing, storage, and/or placement back onto the ground surface in a windrow. Example implementations of the harvester implement may include, but are not limited to, a harvester header for a self-propelled windrower or combine, or a mower conditioner mounted to an agricultural tractor. The harvester implement may include, for example, a cutter bar configured for cutting the crop material, and an auger configured to move the cut crop material relative to the cutter bar.

During operation, the auger may become plugged with the cut crop material. When the auger becomes plugged, an operator must stop operation of the crop harvester system, and manually unplug the crop material from the auger before harvest operations may begin again. This creates downtime and reduces harvest efficiency.

SUMMARY

A crop harvester system is provided. The crop harvester system includes a traction unit configured for movement across a ground surface. The traction unit includes a drive system selectively controllable to provide a desired ground speed for harvesting a crop material along a harvest path. A harvester implement is attached to the traction unit. The Harvester implement includes a cutter bar and an auger. The cutter bar is operable at a cutter speed and configured for cutting the crop material. The auger is operable at an auger speed and configured for moving the crop material relative to the cutter bar. An image sensor is positioned to capture an image of the crop material disposed forward of the harvester implement along the harvest path. A radar system includes a transmitter positioned and operable to emit an electromagnetic signal in a direction forward of the harvester implement along the harvest path, and a receiver positioned and operable to receive a returned electromagnetic signal reflected from the crop material disposed forward of the harvester implement along the harvest path. A controller includes a processor and a memory having a plug avoidance algorithm stored thereon. The processor is operable to execute the plug avoidance algorithm to determine a volume of the crop material in a region forward of the harvester implement along the harvest path from the image of the crop material captured by the image sensor. The controller may then determine a moisture content of the crop material in the region forward of the harvester implement along the harvest path from the returned electromagnetic signal received by the radar system. The controller may further determine a density of the crop material in the region forward of the harvester implement along the harvest path from the returned electromagnetic signal received by the radar system. The controller may then control one of the traction unit and the harvester implement while the harvester implement is cutting the crop material in the region based on the volume of the crop material, the moisture content of the crop material, and the density of the crop material in the region to avoid plugging of the auger with the cut crop material.

In one aspect of the disclosure, the processor may be operable to execute the plug avoidance algorithm to control the traction unit by controlling the drive system of the traction unit to adjust the ground speed of the traction unit and the harvester implement attached thereto.

In one aspect of the disclosure, the processor may be operable to execute the plug avoidance algorithm to control the harvester implement by controlling the auger to adjust the auger speed.

In one aspect of the disclosure, the processor may be operable to execute the plug avoidance algorithm to control the harvester implement by controlling the cutter bar to adjust the cutter speed.

In one aspect of the disclosure, the processor may be operable to execute the plug avoidance algorithm to control the harvester implement by simultaneously controlling both the auger to adjust the auger speed and the cutter bar to adjust the cutter speed.

In one aspect of the disclosure, the processor may be operable to execute the plug avoidance algorithm to control one of the auger to adjust the auger speed or the cutter bar to adjust the cutter speed to maintain a desired slip ratio between the auger speed and the cutter speed.

In one aspect of the disclosure the processor may be operable to execute the plug avoidance algorithm to estimate a crop material mass flow rate expected through the harvester implement from the region based on the volume of the crop material, the moisture content of the crop material, and the density of the crop material in the region. The controller may then compare the crop material mass flow rate expected through the harvester implement from the region to a threshold value to determine if the crop material mass flow rate is equal to or less than the threshold value, or if the crop material mass flow rate is greater than the threshold value. When the crop material mass flow rate is greater than the threshold value, the controller may control the one of the traction unit and the harvester implement, while the harvester implement is cutting the crop material in the region, as described above.

In one aspect of the disclosure, the image sensor may include, but is not limited to, one of a stereo camera operable to provide a stereo image, or a combination of a first camera and a second camera that are laterally offset from each other relative to the harvest path and which are positioned to capture an image of the region from a different perspective relative to each other, the combination of which provides a stereo image.

In one aspect of the disclosure, the radar system may include an ultra-wideband radar system that is operable in a frequency range of between 3.1 GHz and 10.6 GHz.

In one aspect of the disclosure, the processor may be operable to execute the plug avoidance algorithm to determine the volume of the crop material in the region by estimating a height of the crop material in the region from depth data related to the crop material in the region obtained from the image captured by the image sensor, and multiplying an area of the region by the estimated height of the crop material in the region.

A method of controlling the crop harvester system is also provided. The crop harvester system may include, for example, a traction unit and a harvester implement attached to the traction unit. The method includes sensing a stereo image of a region of a field located forward of the harvester implement along a harvest path with a stereo camera system. A volume of the crop material in the region forward of the harvester implement along the harvest path may be determined with a controller from the stereo image of the crop material captured by the stereo camera system. An electromagnetic signal may be emitted from a transmitter of a radar system. The electromagnetic signal is directed toward the region of the field located forward of the harvester implement along the harvest path. A returned electromagnetic signal, reflected from the crop material disposed forward of the harvester implement along the harvest path, may be received by a receiver of the radar system. A moisture content of the crop material in the region forward of the harvester implement along the harvest path may be determined with the controller from the returned electromagnetic signal received by the radar system. A density of the crop material in the region forward of the harvester implement along the harvest path may be determined with the controller from the returned electromagnetic signal received by the radar system. The controller may then control an operating characteristic of one of the traction unit and the harvester implement while the harvester implement is cutting the crop material in the region based on the volume of the crop material, the moisture content of the crop material, and the density of the crop material in the region, to avoid plugging of an auger of the harvester implement with the cut crop material.

In one aspect of the method provided in the disclosure, the step of controlling the operating characteristic of one of the traction unit and the harvester implement may include controlling a drive system of the traction unit to adjust a ground speed of the traction unit and the harvester implement attached thereto.

In one aspect of the method provided in the disclosure, the step of controlling the operating characteristics of one of the traction unit and the harvester implement may include controlling the auger to adjust an auger speed.

In one aspect of the method provided in the disclosure, the step of controlling the operating characteristics of one of the traction unit and the harvester implement may include controlling a cutter bar of the harvester implement to adjust a cutter speed.

In one aspect of the method provided in the disclosure, the step of controlling the operating characteristics of one of the traction unit and the harvester implement may include simultaneously controlling one or both the auger to adjust an auger speed and a cutter bar of the harvester implement to adjust a cutter speed, for example, to maintain a desired slip ratio between the auger speed and the cutter speed.

In one aspect of the method provided in the disclosure, the method may further include estimating, with the controller, a crop material mass flow rate expected through the harvester implement from the region based on the volume of the crop material, the moisture content of the crop material, and the density of the crop material in the region. The controller may then compare the crop material mass flow rate expected through the harvester implement from the region to a threshold value to determine if the crop material mass flow rate is equal to or less than the threshold value, or if the crop material mass flow rate is greater than the threshold value. The controller may then control the operating characteristic of one of the traction unit and the harvester implement when the crop material mass flow rate is greater than the threshold value.

Accordingly, the system and method describe herein estimates the mass flow rate of the crop material in a region using a stereo image captured from the image sensor and data sensed from the radar system. As such, the controller may use sensor fusion of the Ultra-Wideband Radar and the stereo image to estimate the volume of the crop material, the density of the crop material, and the moisture content of the crop material, in order to estimate the mass flow rate of the crop material in the region. Based on the mass flow rate of the crop material, for example, being greater than a threshold value, the controller may then control one or more of the ground speed of the crop harvester system, the auger speed, and/or the cutter bar speed, to avoid plugging. For example, if the controller determines that the mass flow rate of the crop material estimated to pass through the harvester implement while cutting the region is greater than the threshold value, the controller may slow the ground speed of the crop harvester system and/or increase speed of the auger. By doing so, the crop harvester system may avoid plugging the auger with the cut crop material, thereby eliminating downtime and improving harvest efficiency.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 6 is a flow chart representing a method of operating the crop harvester system.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
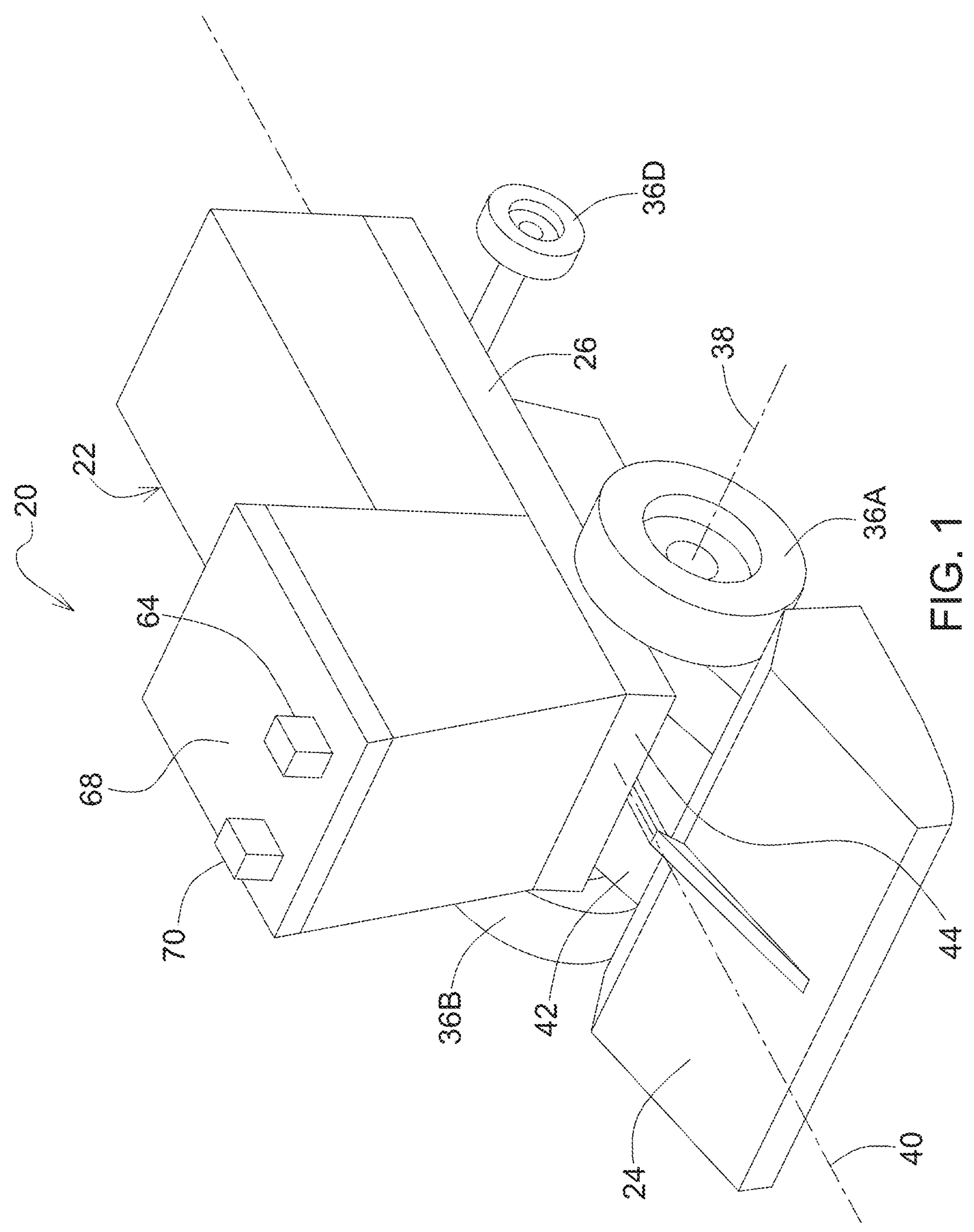
FIG. 1 is a schematic perspective view of a crop harvester system.

Referring to the Figures, wherein like numerals indicate like parts throughout the several views, a crop harvester system is generally shown at 20 in FIG. 1. The crop harvester system 20 includes a traction unit 22 and a harvester implement 24 attached to the traction unit 22. The example implementation of the crop harvester system 20 shown in FIG. 1 is configured as a self-propelled windrower. However, it should be appreciated that the teachings of this disclosure may be applied to systems other than the example self-propelled windrower depicted in Figure. For example, the crop harvester system 20 may alternatively be configured as a combine harvester or a mower-conditioner drawn by an agricultural tractor.

Figure 2:
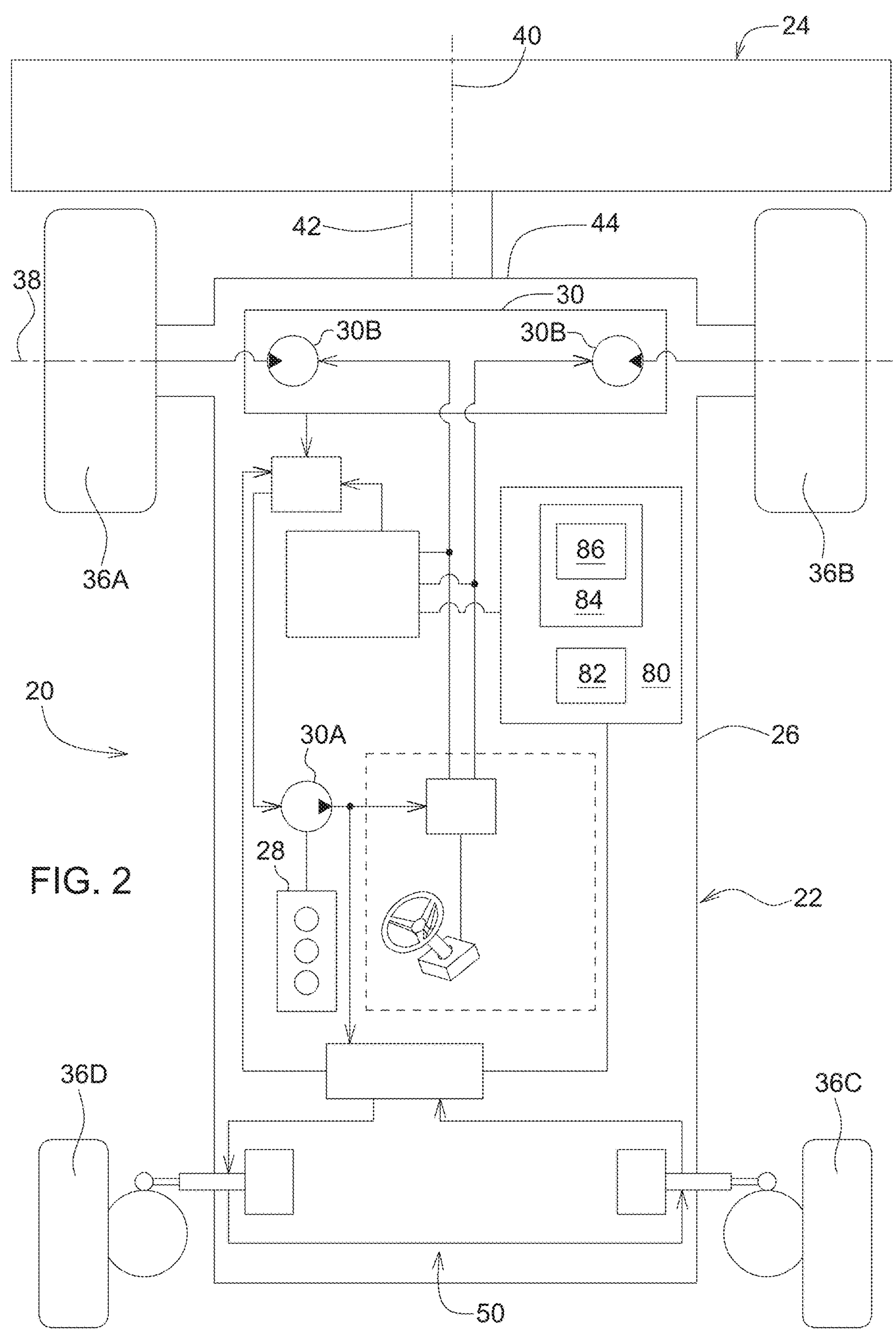
FIG. 2 is a schematic plan view of the crop harvester system.

Referring to FIGS. 1 and 2, the traction unit 22 includes a frame 26, which supports a prime mover or primary power source 28. The primary power source 28 may include, but is not limited to, an internal combustion engine, an electric motor, a combination of both, or some other device capable of generating torque to power the crop harvester system 20. The traction unit 22 includes a drive system 30 for propelling and moving the traction unit 22 across a ground surface 32 and through a field 34. The drive system 30 is selectively controllable to provide a desired ground speed relative to the ground surface 32. The drive system 30 may include, for example, a traditional drive train that is directly powered by the primary power source 28, a hydraulic drive system 30 that includes a hydraulic pump 30A powering one or more hydraulic motors 30B, an electric motor, etc. The drive system 30 may be controlled to provide the desired ground speed and/or steering affect in a manner understood by those skilled in the art, for example, via one or more control signals, throttle input, valve actuation, etc. The crop harvester system 20 may move along a harvest path for harvesting a crop material along the harvest path.

The frame 26 is moveably supported relative to the ground surface 32 by at least one ground engaging element 36A, 36B, 36C, 36D. In the example implementation shown in FIGS. 1 and 2, the traction unit 22 includes a left front drive wheel 36A and a right front drive wheel 36B each mounted to the frame 26, adjacent a forward end 44 of the frame 26. The left front drive wheel 36A and the right front drive wheel 36B are rotatable about a transverse axis 38. The transverse axis 38 is generally perpendicular to a longitudinal axis 40 of the frame 26. The left front drive wheel 36A and the right front drive wheel 36B may be simultaneously rotated in the same rotational direction and at the same rotational speed about the transverse axis 38 to drive the crop harvester system 20 forward or rearward, depending upon the direction of rotation. Additionally, the left front drive wheel 36A and the right front drive wheel 36B may be rotated in the same rotational direction at different rotational speeds about the transverse axis 38, or in opposite rotational directions at the same or different rotational speeds about the transverse axis 38, in order to turn the crop harvester system 20. The traction unit 22 further includes a left rear caster wheel 36D and a right rear caster wheel 36C attached to the frame 26. As used herein, the term "caster wheel" should be understood to include a wheel that is able to rotate a full three hundred sixty degrees (360°) about a respective generally vertical axis. As such, each of the left rear caster wheel 36D and the right rear caster wheel 36C are rotatable a full three hundred sixty degrees (360°) about a respective generally vertical axis.

It should be appreciated that the traction unit 22 may be implemented differently than the example implementation of the self-propelled windrower described above. For example, in other implementations, the traction unit 22 may be implemented as an agricultural tractor as understood by those skilled in the art, which includes steerable front wheels and non-steerable driven rear wheels.

Referring to FIGS. 1 and 2, the example implementation of the traction unit 22 includes a linkage system 42 attached to the frame 26. In the implementation shown in the FIG. 1 and described herein, the linkage system 42 is attached to the frame 26 adjacent the forward end 44 of the frame 26. In other implementations, the linkage system 42 may be attached to the frame 26 adjacent a rearward end of the frame 26. For example, the linkage system 42 may be configured as a three-point hitch system understood by those skilled in the art. The linkage system 42 is configured for attaching the harvester implement 24 to the frame 26. The specific details, construction and operation of the linkage system 42 are not pertinent to the teachings of this disclosure, and are therefore not described in detail herein.

Figure 3:
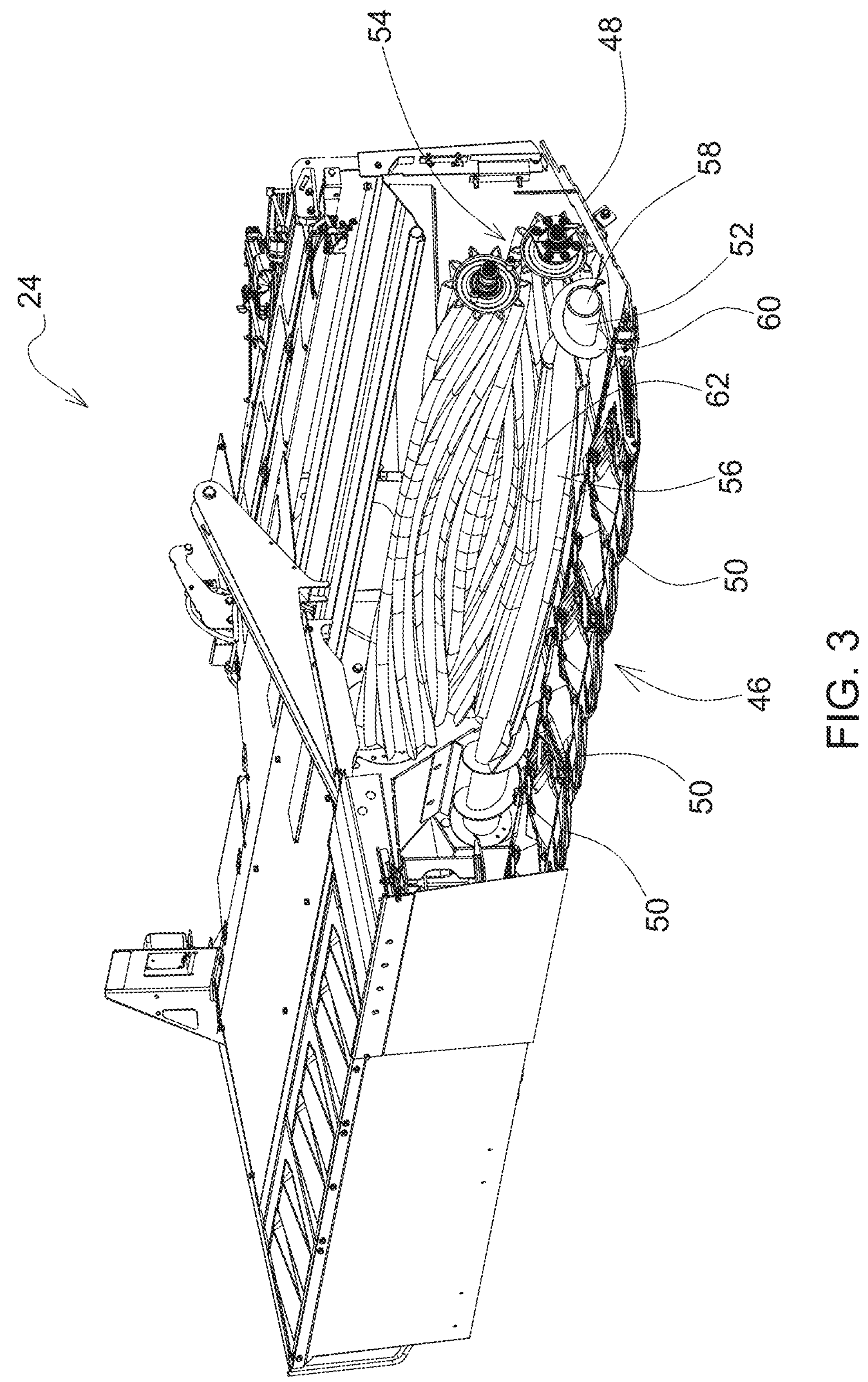
FIG. 3 is a schematic perspective cut-away section of a harvester implement of the crop harvester system.
Figure 4:
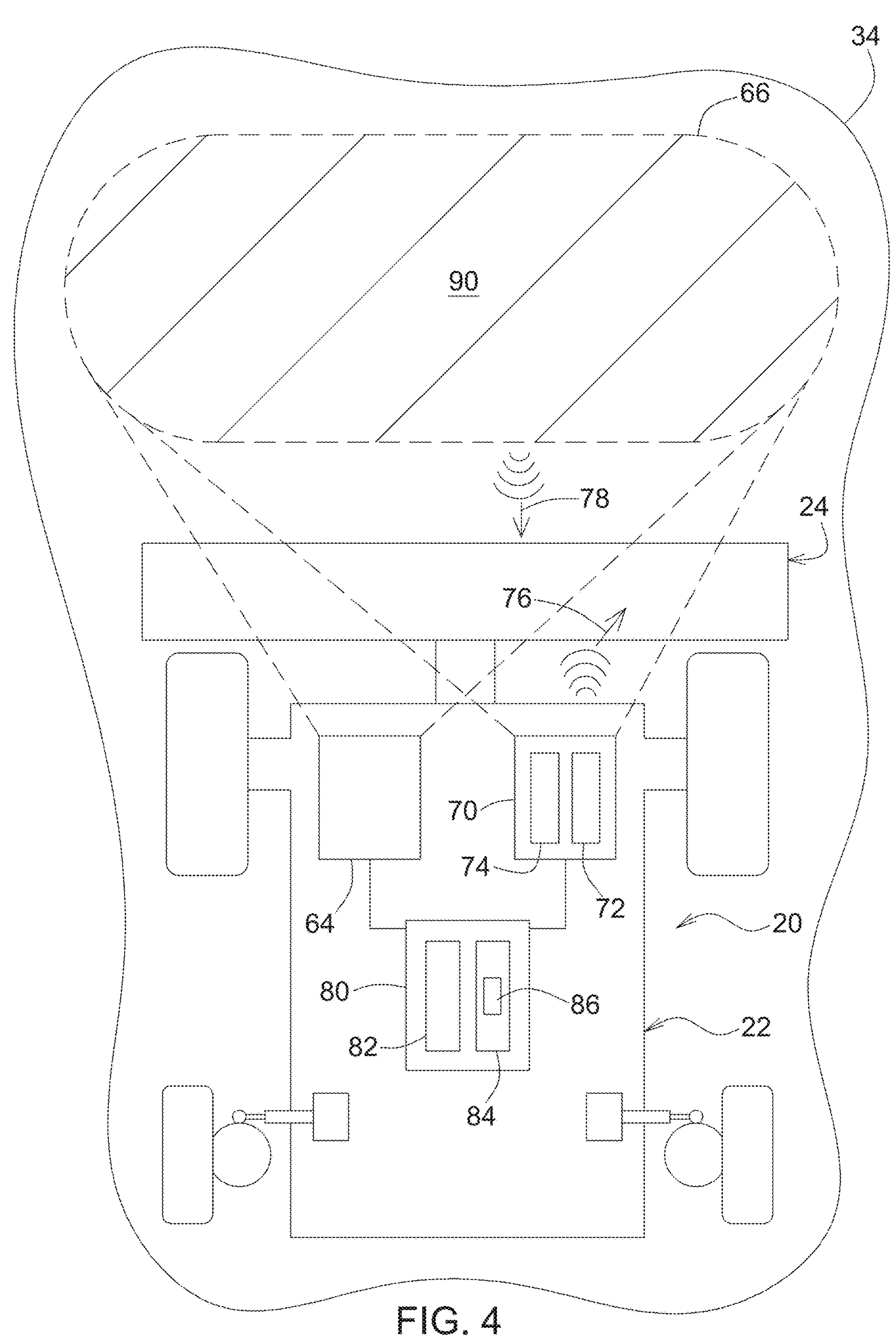
FIG. 4 is a schematic plan view of the crop harvester system while harvesting crop material in a field.

The harvester implement 24 may include, but is not limited to, a rotary cutter such as shown in FIG. 3, a draper cutter, a mower conditioner, etc. Referring to FIG. 3, the example implementation of the harvester implement 24 shown in the FIGS. and described herein includes a cutter bar 46 operable at a cutter speed and configured for cutting standing crop material in the field 34. The cutter bar 46 may include any mechanism that is capable of cutting the crop material. As shown in the Figures, the cutter bar 46 is embodied as a rotary disc cutter bar 46. However, the cutter bar 46 is not limited to the exemplary embodiment of the rotary disc cutter bar 46. As such, it should be appreciated that the cutter bar 46 may vary from the exemplary embodiment shown in the Figures and described herein.

The cutter bar 46 is supported by an implement support structure 48. The cutter bar 46 extends along an axis that is disposed generally transverse to a direction of travel of the harvester implement 24. The cutter bar 46 includes a plurality of cutting discs 50 spaced along the cutter bar 46 for rotation about respective vertical axes. Each of the cutting discs 50 is coupled to an upright drive shaft to which power is supplied for causing the cutting discs 50 to rotate in appropriate directions, for delivering cut crop material to an auger 52 disposed rearward of the cutter bar 46.

Referring to FIG. 3, the auger 52 is rotatably mounted to the implement support structure 48, and passes in front of a crop conditioning system 54. In particular, the auger 52 is positioned in front of and lower than the crop conditioning system 54. The auger 52 includes a central cylindrical drum with a central portion 56 and outer ends 58. The outer ends 58 of the auger 52 may include flighting 60, and a plurality of fins 62 may be attached to the central portion 56. The auger 52 is operable at an auger 52 speed and configured for moving the crop material relative to the cutter bar 46. In operation, the design of the auger 52 enables the delivery of cut crop material into the crop conditioning system 54. The cutter bar 46 delivers cut crop material to the auger 52, which in turn delivers the cut crop material rearward for further processing by the crop conditioning system 54. The conditioned crop material is expelled rearward by the crop conditioning system 54, and is formed into a windrow or swath by upright right and left forming panels and a swathboard.

The crop harvester system 20 further includes an image sensor 64 that is positioned to capture an image of the crop material in a region 66 disposed forward of the harvester implement 24 along the harvest path. For example, the image sensor 64 may be positioned above an operator's station 68 of the traction unit 22, or directly on the harvester implement 24. The image sensor 64 is aimed to capture an image disposed in the region 66 located forward of the harvester implement 24 relative to the direction of travel of the harvester implement 24 during harvest operations. As such, the image sensor 64 is positioned to capture an image of the standing crop material prior to being cut or severed by the cutter bar 46.

The image sensor 64 may include, but is not limited to, one of a stereo camera configured to capture a stereo image including relative depth/distance data, or a combination of multiple cameras, e.g., a first camera and a second camera, which are laterally offset from each other relative to the harvest path and positioned to capture an image of the region 66 from a different perspective relative to each other, which may be combined to generate a stereo image including relative depth/distance data.

The crop harvester system 20 may further include a radar system 70. The radar system 70 may include a transmitter 72 and a receiver 74. The transmitter 72 and the receiver 74 may be independent, separate components, or may be co-located and/or monostatic. The transmitter 72 may be positioned and operable to emit an electromagnetic signal 76 into the region 66 disposed forward of the harvester implement 24 and along the harvest path relative to the direction of travel of the harvester implement 24 during harvest operations. The receiver 74 may be positioned and operable to receive a returned electromagnetic signal 78 reflected from the crop material disposed in the region 66 located forward of the harvester implement 24 along the harvest path. The components and operation of the radar system 70, including the transmitter 72 and the receiver 74, are understood by those skilled in the art, and not pertinent to the teachings of this disclosure, and are therefore not described in greater detail herein. In one example implementation, the radar system 70 may include, but is not limited to, an ultra-wideband radar system 70 that is operable to emit electromagnetic radio waves in a frequency range of between 3.1 GHz and 10.6 GHz.

The crop harvester system 20 further includes a controller 80. The controller 80 is disposed in communication with the image sensor 64 and the radar sensor. The controller 80 is operable to receive image signals from the image sensor 64, radar/data signals from the radar system 70, and communicate a control signal to at least one of the drive system 30, the cutter bar 46, and/or the auger 52. While the controller 80 is generally described herein as a singular device, it should be appreciated that the controller 80 may include multiple devices linked together to share and/or communicate information therebetween. Furthermore, it should be appreciated that the controller 80 may be located on the traction unit 22, the harvester implement 24, or located remotely from the crop harvester system 20

The controller 80 may alternatively be referred to as a computing device, a computer, a control unit, a control module, a module, etc. The controller 80 includes a processor 82, a memory 84, and all software, hardware, algorithms, connections, sensors, etc., necessary to manage and control the operation of the crop harvester system 20 described herein. As such, a method may be embodied as a program or algorithm operable on the controller 80. It should be appreciated that the controller 80 may include any device capable of analyzing data from various sensors, comparing data, making decisions, and executing the required tasks.

As used herein, "controller 80" is intended to be used consistent with how the term is used by a person of skill in the art, and refers to a computing component with processing, memory, and communication capabilities, which is utilized to execute instructions (i.e., stored on the memory 84 or received via the communication capabilities) to control or communicate with one or more other components. In certain embodiments, the controller 80 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 80 may be in communication with other components of the crop harvester system 20, such as hydraulic components, electrical components, and operator inputs within the operator's station 68 of the traction unit 22. The controller 80 may be electrically connected to these other components wirelessly or via a wiring harness such that messages, commands, and electrical power may be transmitted between the controller 80 and the other components. Although the controller 80 is referenced in the singular, in alternative embodiments the configuration and functionality described herein can be split across multiple devices using techniques known to a person of ordinary skill in the art.

The controller 80 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning, signal processing, and buffer electronics.

The computer-readable memory 84 may include any non-transitory/tangible medium which participates in providing data or computer-readable instructions. The memory 84 may be non-volatile or volatile. Non-volatile media may include, for example, optical or magnetic disks and other persistent memory. Example volatile media may include dynamic random access memory (DRAM), which may constitute a main memory. Other examples of embodiments for memory 84 include a floppy, flexible disk, or hard disk, magnetic tape or other magnetic medium, a CD-ROM, DVD, and/or any other optical medium, as well as other possible memory devices such as flash memory.

The controller 80 includes the tangible, non-transitory memory 84 on which are recorded computer-executable instructions, including a plug avoidance algorithm 86. The processor 82 of the controller 80 is configured for executing the plug avoidance algorithm 86. The plug avoidance algorithm 86 implements a method of controlling and/or operating the crop harvester system 20, described in detail below.

Figure 6:
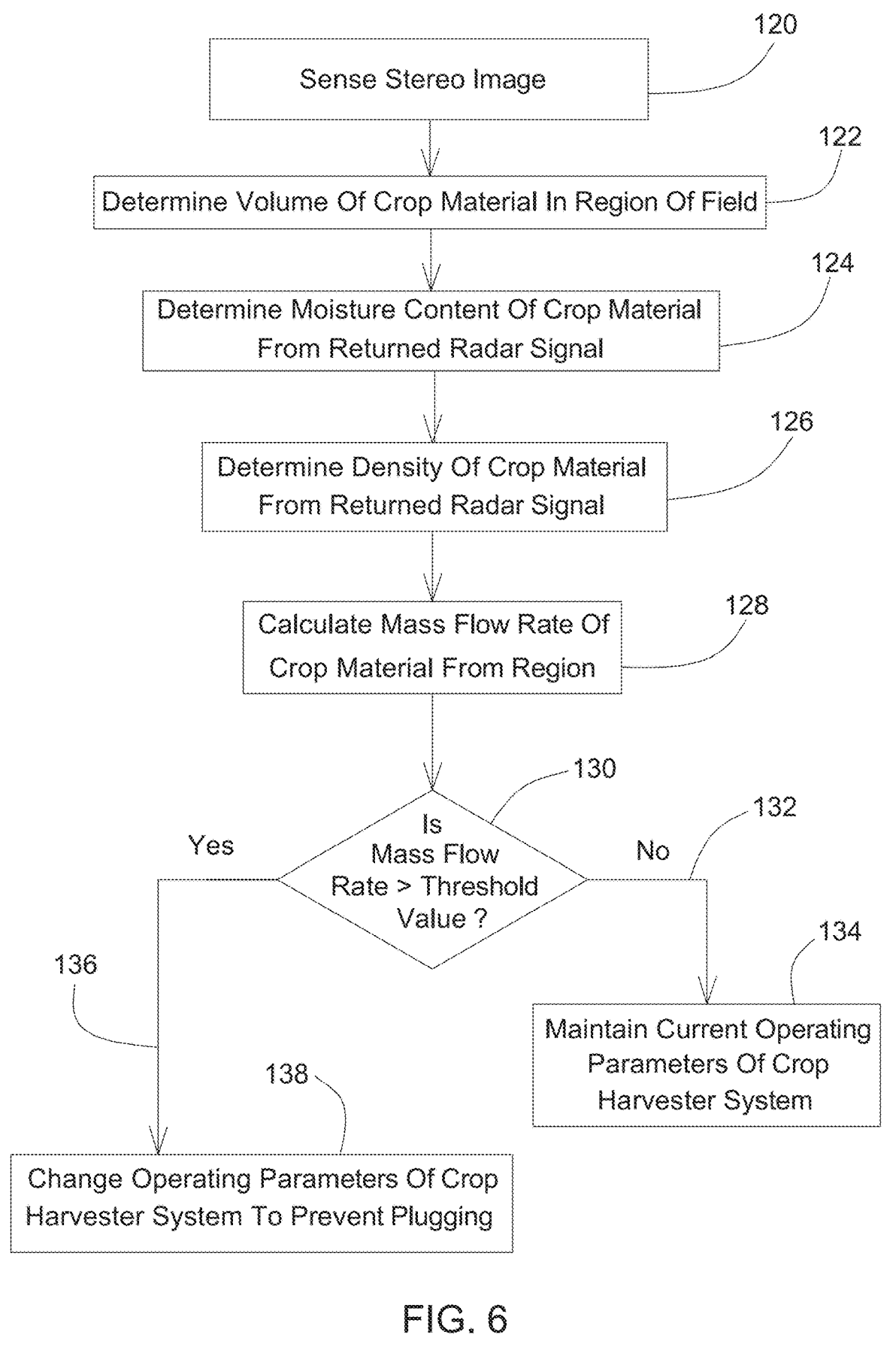

The method described herein includes sensing a stereo image of the region 66 of the field 34 located forward of the harvester implement 24 along the harvest path with the image sensor 64. The step of sensing the stereo image is generally indicated by box 120 shown in FIG. 6. As described above, the image sensor 64 may include, but is not limited to, a stereo camera system operable to capture a stereo image, or a combination of cameras deployed to capture multiple images from different perspectives from which a stereo image may be generated. As understood by those skilled in the art, a stereo image includes three dimensional data, i.e., relative distance data. As such, stereo images may be analyzed by the controller 80 to determine relative distance to and/or between objects. As such, the image sensor 64 is operable to capture an image including depth/distance data that may be retrieved by the controller 80.

The controller 80 may use the captured stereo image from the image sensor 64 to determine a volume of the crop material in the region 66 located forward of the harvester implement 24 along the harvest path prior to the harvester implement 24 engaging and/or cutting the crop material within the region 66. The step of determining the volume of the crop material from the stereo image is generally indicated by box 122 shown in FIG. 6.

Figure 5:
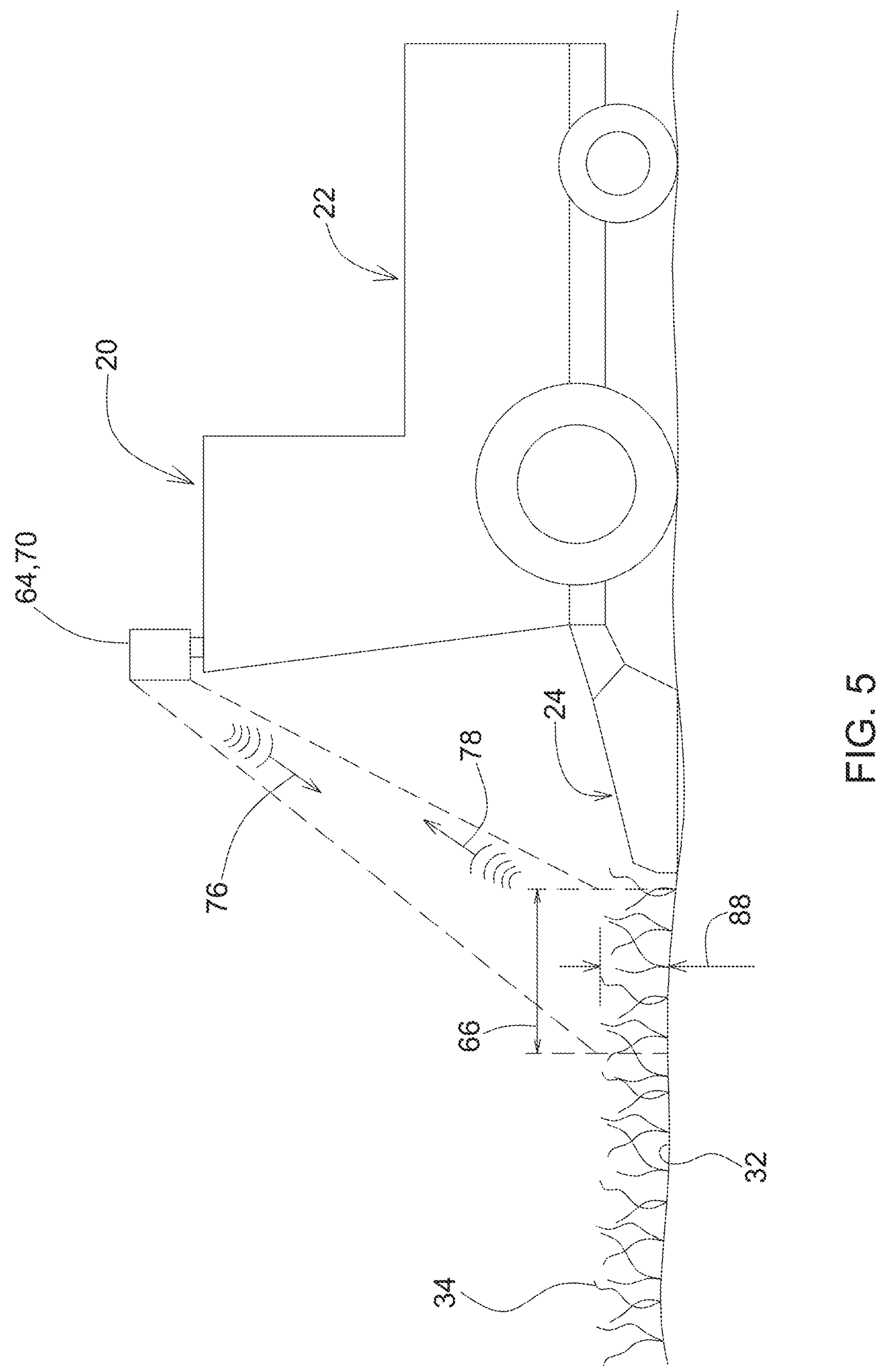
FIG. 5 is a schematic side view of the crop harvester system while harvesting crop material in the field.

The controller 80 may determine the volume of the crop material in the region 66 by estimating a height 88 (shown in FIG. 5) of the crop material in the region 66 from depth data related to the crop material in the region 66 obtained from the stereo image. The height 88 of the crop material may be defined as the distance between the tops of the crop material above the ground surface 32. The estimated height 88 of the crop material may then be multiplied by an area 90 of the region 66 to obtain the estimate of the volume of the crop material in the region 66. It should be appreciated that the region 66 included in the stereo image may be segmented into sub-region 66*s*, with the height 88 of the crop material estimated and the volume determined for each sub-region 66, and the volume of each sub-region 66 aggregated together to define the estimated volume of the entire region 66, in order to increase accuracy of the volume estimation.

The controller 80 may further use data from the radar sensor to determine a characteristic of the crop in the region 66. In order to do so, the transmitter 72 emits the electromagnetic signal 76, which is directed toward the region 66 of the field 34 located forward of the harvester implement 24 along the harvest path. As noted above, the electromagnetic signal 76 may be, but is not required to be, within the frequency range of between 3.1 GHz and 10.6 GHz. As is understood by those skilled in the art, the electromagnetic signal 76 emitted from the transmitter 72 may be reflected by objects in the path of the electromagnetic signal 76, and returned to the radar system 70, particularly the receiver 74. The receiver 74 of the radar system 70 senses or receives the returned electromagnetic signal 78, which is reflected from the crop material disposed forward of the harvester implement 24 along the harvest path.

The controller 80 may then determine a characteristic of the crop material in the region 66 from the data sensed by the radar system 70. For example, the controller 80 may determine a moisture content of the crop material in the region 66 forward of the harvester implement 24 along the harvest path from the returned electromagnetic signal 78 received by the radar system 70. The step of determining the moisture content of the crop material from the returned radar signal is generally indicated by box 124 shown in FIG. 6. The controller 80 may further determine a density of the crop material in the region 66 forward of the harvester implement 24 along the harvest path from the returned electromagnetic signal 78 received by the radar system 70. The step of determining the density of the crop material from the returned radar signal is generally indicated by box 126 shown in FIG. 6.

As is understood by those skilled in the art, the returned electromagnetic signal 78 is highly sensitive to the dielectric constant of the target from which the electromagnetic signal 76 was reflected. As such, the controller 80 may use a model or other similar process to recognize and process the returned electromagnetic signal 78 and determine the dielectric constant for the object from which the electromagnetic signal 76 was reflected, e.g., the crop material in the region 66 of the field 34. The controller 80 may then use another model, table, function, etc., to determine or correlate the dielectric constant to one more material characteristics of the crop material, e.g., the moisture content and/or density of the crop material. The correlation between the dielectric constant and the material characteristics of the crop material, e.g., moisture content and/or density, may be defined in a table, related via a functional relationship, derived using an algorithm, etc. Additionally, it should be appreciated that the controller 80 may use sensor fusion, as understood by those skilled in the art, to combine the stereo images from the image sensor 64 with the radar data from the radar system 70 to determine the volume of the crop material, the density of the crop material and/or the moisture content of the crop material. Fusion of the data from the radar system 70 and the image sensor 64 may be used to allow the close loop system described herein.

The controller 80 may then control an operating characteristic of one of the traction unit 22 and the harvester implement 24 while the harvester implement 24 is cutting the crop material in the region 66 based on the volume of the crop material, the moisture content of the crop material, and the density of the crop material in the region 66, to avoid plugging of the auger 52 of the harvester implement 24 with the cut crop material. In order to do so, the controller 80 may calculate a crop material mass flow rate expected through the harvester implement 24 from the region 66 based on the volume of the crop material, the moisture content of the crop material, and the density of the crop material in the region 66. The step of calculating the mass flow rate of the crop material is generally indicated by box 128 shown in FIG. 6. The estimated mass flow rate of the crop material is the amount of crop material expected to pass through the harvester implement 24 when harvesting the region 66 of the field 34. The controller 80 may use the volume of the crop material in the region 66, the density of the crop material in the region 66, and the moisture content of the crop material in the region 66, as inputs into a model or calculator that predicts or estimates the mass of the crop material. The controller 80 may then use the estimated mass of the crop material in combination with the ground speed of the harvester implement 24 to determine or calculate the estimated mass flow rate of the crop material through the harvester implement 24. The mass flow rate may be defined as, but is not limited to, the mass per unit time processed through the harvester implement 24.

The controller 80 may then compare the crop material mass flow rate expected through the harvester implement 24 from the region 66 to a threshold value to determine if the crop material mass flow rate is equal to or less than the threshold value, or if the crop material mass flow rate is greater than the threshold value. The step of determining if the mass flow rate is less than or equal to the threshold value, or if the mass flow rate is greater than the threshold value, is generally indicated by box 130 shown in FIG. 6. The threshold value may be defined or set to represent a level or amount of crop flow at which the harvester implement 24 is expected to operate without plugging. In other words, the threshold value may be set or defined to include a value representing an expected upper limit of un-interrupted performance of the harvester implement 24. If the estimated crop material mass flow rate is equal to or less than the threshold value, generally indicated at 132, the controller 80 may determine that the harvester implement 24 may continue to operate at the current operational settings with little expectation of plugging, generally indicated by box 134 shown in FIG. 6. However, if the estimated crop material mass flow rate is greater than the threshold value, generally indicated at 136, the controller 80 may determine that plugging of the harvester implement 24 is possible, and may alter or change an operating characteristic of one of the traction unit 22 and the harvester implement 24 while the harvester implement 24 is cutting the crop material in the region 66 to avoid potential plugging of the auger 52 of the harvester implement 24 with the cut crop material. The step of changing the operating characteristic of the harvester system 20 is generally indicated by box 138 shown in FIG. 6.

In one example, when the estimated crop material mass flow rate is greater than the threshold value, the controller 80 may control the auger 52 of the harvester implement 24 while the harvester implement 24 is cutting the crop material in the region 66 to adjust the auger 52 speed. For example, the controller 80 may increase the auger 52 speed to increase the amount of cut crop material the auger 52 moves between the cutter bar 46 and the crop processing system. In another example, when the estimated crop material mass flow rate is greater than the threshold value, the controller 80 may control the cutter bar 46 to adjust the cutter speed, In one implementation, the controller 80 may increase both the auger 52 speed and the cutter speed simultaneously. In one aspect of the disclosure, the controller 80 may control one or both of the auger 52 and the cutter bar 46 to adjust the auger 52 speed and/or the cutter speed respectively to maintain a desired slip ratio between the auger 52 speed and the cutter speed.

In one example, when the estimated crop material mass flow rate is greater than the threshold value, the controller 80 may control the traction unit 22 by controlling the drive system 30 of the traction unit 22 to adjust the ground speed of the traction unit 22 and the harvester implement 24 attached thereto. For example, the controller 80 may control the drive system 30 to decrease the ground speed, and thereby reduce the mass flow rate of the crop material to a level suitable for the current operating parameters of the harvester implement 24. It should be appreciated that the controller 80 may control the drive system 30 to reduce the ground speed while simultaneously increasing the auger 52 speed and/or the cutter speed to prevent plugging of the auger 52 with the cut crop material.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A crop harvester system comprising:

a traction unit configured for movement across a ground surface, and having a drive system selectively controllable to provide a desired ground speed for harvesting a crop material along a harvest path;

a harvester implement attached to the traction unit and including a cutter bar operable at a cutter speed and configured for cutting the crop material;

the harvester implement further including an auger operable at an auger speed and configured for moving the crop material relative to the cutter bar;

an image sensor positioned to capture an image of the crop material disposed forward of the harvester implement along the harvest path;

a radar system including a transmitter positioned and operable to emit an electromagnetic signal in a direction forward of the harvester implement along the harvest path, and a receiver positioned and operable to receive a returned electromagnetic signal reflected from the crop material disposed forward of the harvester implement along the harvest path;

a controller including a processor and a memory having a plug avoidance algorithm stored thereon, wherein the processor is operable to execute the plug avoidance algorithm to:

determine a volume of the crop material in a region forward of the harvester implement along the harvest path from the image of the crop material captured by the image sensor;

determine a moisture content of the crop material in the region forward of the harvester implement along the harvest path from the returned electromagnetic signal received by the radar system;

determine a density of the crop material in the region forward of the harvester implement along the harvest path from the returned electromagnetic signal received by the radar system; and control one of the traction unit and the harvester implement while the harvester implement is cutting the crop material in the region based on the volume of the crop material, the moisture content of the crop material, and the density of the crop material in the region to avoid plugging of the auger with the cut crop material.

2. The crop harvester system set forth in claim 1, wherein the processor is operable to execute the plug avoidance algorithm to control the traction unit by controlling the drive system of the traction unit to adjust the ground speed of the traction unit and the harvester implement attached thereto.

3. The crop harvester system set forth in claim 1, wherein the processor is operable to execute the plug avoidance algorithm to control the harvester implement by controlling the auger to adjust the auger speed.

4. The crop harvester system set forth in claim 1, wherein the processor is operable to execute the plug avoidance algorithm to control the harvester implement by controlling the cutter bar to adjust the cutter speed.

5. The crop harvester system set forth in claim 1, wherein the processor is operable to execute the plug avoidance algorithm to control one of the auger to adjust the auger speed or the cutter bar to adjust the cutter speed to maintain a desired slip ratio between the auger speed and the cutter speed.

6. The crop harvester system set forth in claim 1, wherein the processor is operable to execute the plug avoidance algorithm to estimate a crop material mass flow rate expected through the harvester implement from the region based on the volume of the crop material, the moisture content of the crop material, and the density of the crop material in the region.

7. The crop harvester system set forth in claim 6, wherein the processor is operable to execute the plug avoidance algorithm to compare the crop material mass flow rate expected through the harvester implement from the region to a threshold value to determine if the crop material mass flow rate is equal to or less than the threshold value, or if the crop material mass flow rate is greater than the threshold value.

8. The crop harvester system set forth in claim 7, wherein the processor is operable to execute the plug avoidance algorithm to control the one of the traction unit and the harvester implement while the harvester implement is cutting the crop material in the region when the crop material mass flow rate is greater than the threshold value.

9. The crop harvester system set forth in claim 1, wherein the image sensor includes one of a stereo camera, or a first camera and a second camera laterally offset from each other relative to the harvest path and positioned to capture an image of the region from a different perspective relative to each other.

10. The crop harvester system set forth in claim 1, wherein the radar system includes an ultra-wideband radar system operable in a frequency range of between 3.1 GHz and 10.6 GHz.

11. The crop harvester system set forth in claim 1, wherein the processor is operable to execute the plug avoidance algorithm to determine the volume of the crop material in the region by estimating a height of the crop material in the region from depth data related to the crop material in the region obtained from the image captured by the image sensor, and multiplying an area of the region by the estimated height of the crop material in the region.

12. The crop harvester system set forth in claim 1, wherein the processor is operable to execute the plug avoidance algorithm to use sensor fusion to combine the image of the crop material captured by the image sensor and the returned electromagnetic signal received by the radar system to determine the density of the crop material in the region forward of the harvester implement along the harvest path, the volume of the crop material in the region forward of the harvester implement along the harvest path, and the moisture content of the crop material in the region forward of the harvester implement along the harvest path.

13. A crop harvester system comprising:

a harvester implement including a cutter bar operable at a cutter speed and configured for cutting the crop material, and an auger operable at an auger speed and configured for moving the crop material relative to the cutter bar;

an image sensor positioned to capture an image of the crop material disposed forward of the harvester implement along a harvest path;

a radar system including a transmitter positioned and operable to emit an electromagnetic signal in a direction forward of the harvester implement along the harvest path, and a receiver positioned and operable to receive a returned electromagnetic signal reflected from the crop material disposed forward of the harvester implement along the harvest path;

a controller including a processor and a memory having a plug avoidance algorithm stored thereon, wherein the processor is operable to execute the plug avoidance algorithm to:

determine a volume of the crop material in a region forward of the harvester implement along the harvest path from the image of the crop material captured by the image sensor;

determine a moisture content of the crop material in the region forward of the harvester implement along the harvest path from the returned electromagnetic signal received by the radar system;

determine a density of the crop material in the region forward of the harvester implement along the harvest path from the returned electromagnetic signal received by the radar system; and control one of the cutter bar and the auger while the harvester implement is cutting the crop material in the region based on the volume of the crop material, the moisture content of the crop material, and the density of the crop material in the region to avoid plugging of the auger with the cut crop material.

14. A method of controlling a crop harvester system having a traction unit and a harvester implement attached to the traction unit, the method comprising:

sensing a stereo image of a region of a field located forward of the harvester implement along a harvest path with a stereo camera system;

determining a volume of the crop material in the region forward of the harvester implement along the harvest path from the stereo image of the crop material captured by the stereo camera system;

emitting an electromagnetic signal from a transmitter of a radar system directed toward the region of the field located forward of the harvester implement along the harvest path;

receiving a returned electromagnetic signal, reflected from the crop material disposed forward of the harvester implement along the harvest path, with a receiver of the radar system;

determining a moisture content of the crop material in the region forward of the harvester implement along the harvest path from the returned electromagnetic signal received by the radar system;

determining a density of the crop material in the region forward of the harvester implement along the harvest path from the returned electromagnetic signal received by the radar system; and controlling an operating characteristic of one of the traction unit and the harvester implement while the harvester implement is cutting the crop material in the region based on the volume of the crop material, the moisture content of the crop material, and the density of the crop material in the region to avoid plugging of an auger of the harvester implement with the cut crop material.

15. The method set forth in claim 14, wherein controlling the operating characteristic of one of the traction unit and the harvester implement includes controlling a drive system of the traction unit to adjust a ground speed of the traction unit and the harvester implement attached thereto.

16. The method set forth in claim 14, wherein controlling the operating characteristics of one of the traction unit and the harvester implement includes controlling the auger to adjust an auger speed.

17. The method set forth in claim 14, wherein controlling the operating characteristics of one of the traction unit and the harvester implement includes controlling a cutter bar of the harvester implement to adjust a cutter speed.

18. The method set forth in claim 14, wherein controlling the operating characteristics of one of the traction unit and the harvester implement includes controlling one of the auger to adjust an auger speed or a cutter bar of the harvester implement to adjust a cutter speed to maintain a desired slip ratio between the auger speed and the cutter speed.

19. The method set forth in claim 14, further comprising estimating a crop material mass flow rate expected through the harvester implement from the region based on the volume of the crop material, the moisture content of the crop material, and the density of the crop material in the region.

20. The method set forth in claim 19, further comprising:

comparing the crop material mass flow rate expected through the harvester implement from the region to a threshold value to determine if the crop material mass flow rate is equal to or less than the threshold value, or if the crop material mass flow rate is greater than the threshold value; and wherein controlling an operating characteristic of one of the traction unit and the harvester implement while the harvester implement is cutting the crop material in the region based on the volume of the crop material, the moisture content of the crop material, and the density of the crop material in the region is further defined as controlling the operating characteristic of one of the traction unit and the harvester implement, while the harvester implement is cutting the crop material in the region, when the crop material mass flow rate is greater than the threshold value.

* * * * *